US008174785B2

(12) United States Patent  (10) Patent No.: US 8,174,785 B2
Tanner et al.  (45) Date of Patent: May 8, 2012

(54) METHOD AND APPARATUS FOR DETECTING RAPID OFF TRACK FOLLOWING AND PROTECTING NEARBY TRACKS FROM RAPID OFF TRACK WRITING IN A HARD DISK DRIVE

(75) Inventors: Brian K. Tanner, San Jose, CA (US); Debasis Baral, San Jose, CA (US); Loc Hoang Nguyen, Milpitas, CA (US)

(73) Assignee: Seagate Technology International, Grand Cayman (KY)

( * ) Notice: Subject to any disclaimer, the term of this patent is extended or adjusted under 35 U.S.C. 154(b) by 112 days.

(21) Appl. No.: 12/633,509

(22) Filed: Dec. 8, 2009

(65) Prior Publication Data

US 2011/0069415 A1    Mar. 24, 2011

Related U.S. Application Data

(60) Provisional application No. 61/244,421, filed on Sep. 21, 2009.

(51) Int. Cl.
*G11B 15/04* (2006.01)
(52) U.S. Cl. .......................... 360/60; 360/31; 360/266.4
(58) Field of Classification Search ........................ None
See application file for complete search history.

(56) References Cited

U.S. PATENT DOCUMENTS

| | | | | |
|---|---|---|---|---|
| 6,175,457 B1 * | 1/2001 | Flynn | ............................... | 360/46 |
| 6,373,647 B1 * | 4/2002 | Baker | ............................ | 360/25 |
| 6,930,853 B2 * | 8/2005 | Settje et al. | ................. | 360/78.04 |
| 7,349,174 B2 * | 3/2008 | Bi et al. | ...................... | 360/78.09 |
| 7,525,751 B2 * | 4/2009 | Han et al. | ......................... | 360/75 |

* cited by examiner

*Primary Examiner* — Jason Olson

(57) ABSTRACT

This application discloses a hard disk drive using a self-resonant frequency band of a Voice Coil Motor far above its operational frequency band to predict Rapid Off Track events before its head stack assembly can deliver the disruption to the slider writing a track. A circuit board and/or an integrated circuit are disclosed in various embodiments to predict the ROT events using the self-resonant frequency band and/or to respond to the prediction to suppress the slider writing.

21 Claims, 5 Drawing Sheets

METHOD AND APPARATUS FOR DETECTING RAPID OFF TRACK FOLLOWING AND PROTECTING NEARBY TRACKS FROM RAPID OFF TRACK WRITING IN A HARD DISK DRIVE

CROSS REFERENCE TO RELATED APPLICATIONS

This patent application claims the benefit of Provisional Patent Application No. 61/244,421 filed 21 Sep. 2009, which is incorporated herein by reference.

TECHNICAL FIELD

This invention relates to the detection of Rapid Off Track following and the protecting against nearby track data corruption during Rapid Off Track writing in a hard disk drive.

BACKGROUND OF THE INVENTION

Hard disk drives are at their most vulnerable moment when they write data to a track, because if they miss, data on nearby tracks may be corrupted. One classic source of such harmful events has been collisions between a read-write head and a dust particle on the rotating disk surface accessed by the read-write head, which is somewhat akin to an automobile driving over a rock or through a pothole, and ending up off track. These situations can often be determined to have happened by analyzing the Voice Coil Motor signal, in particular a component of it known as the Back Electro-Magnetic Force (EMF).

However, the problems faced today are much more serious than finding out what has already occurred from a collision. Rapid Off Track following is a very fast response by the head stack assembly to "popping phenomena" such as a non-linear release of stress-strain between two dissimilar metallic components under heat stress. This has several potential causes, slippage between plates making up the head stack assembly, the voice motor assembly and/or the cover assembly. These Rapid Off Track events occur in a very short time interval with a very sharp shock wave through the entire head stack assembly. They are by far the fastest mechanical disruptions that are known to adversely affect the operations of a hard disk drive. They are too fast to be handled by an interrupt handler for a standard microprocessor. They must be noticed before they destroy data on nearby tracks during write operations. And worse yet, they cannot be predicted beforehand.

Traditional mechanical shock sensors for hard disk drives typically track events below their self-resonant frequency of 20-30 K Hertz (Hz). These sensors cannot respond to disturbances in less than 30 microseconds, which is too late to prevent these disruptions from damaging the data of the nearby tracks of the hard disk drive.

SUMMARY OF THE INVENTION

Embodiments of the invention include a hard disk drive comprising a disk base, a spindle motor mounted on the disk base for rotating at least one disk to create at least one rotating disk surface, and a head stack assembly pivotably coupled to the disk base and including voice coil electrically stimulated to position a slider over a track on the rotating disk surface. The voice coil is a movable part of a Voice Coil Motor (VCM) that includes a fixed magnet assembly mounted on the disk base as well as the head stack assembly. The hard disk drive uses a self-resonant frequency band of the VCM far above its operational frequency band to predict Rapid Off Track events before the head stack assembly can deliver the disruption to the slider writing a track. By way example, the operational bandwidth may be between 2-3 K Hz for track seek and often up to 16 K Hz for track following, but the self-resonant bandwidth may be between 150-500 K Hz.

The hard disk drive further includes a Rapid Off Track detector configured to generate a Rapid Off Track prediction signal presented to a Rapid Off Track write suppression circuit that can prevent the write head of the slider from corrupting data of the nearby tracks. The Rapid off Track detector is coupled to a VCM control signal that is driven to provide the operational frequency band of the VCM. The Rapid Off Track detector amplifies and detects ringing by the VCM in its self-resonant band to create the Rapid Off Track prediction signal before the head stack assembly can mechanically respond to the situation. Rapid Off Track write suppression circuit that may stop the ongoing writing of a sector or suppress the soon-to-start writing of a new sector to prevent data corruption of the nearby tracks.

The Rapid Off Track detector may include an amplifier configured to receive the VCM control signal with a gain in the VCM self-resonant band to at least partly create the VCM self-resonant component of the VCM control signal. The detector may further include a comparator receiving the VCM self-resonant component and a Rapid Off Track threshold to further create the Rapid Off Track prediction signal.

The detector may further include at least one instance of an Analog to Digital Converter and/or a filter to further create the Rapid Off Track prediction signal. In some embodiments, the comparator may be analog and in other embodiments, it may be digital. The inputs to the comparator may be analog and the output of the Rapid Off Track prediction signal may be analog and/or digital.

The Rapid Off Track write suppression circuit may include an amplifier configured with a write suppression signal to suppress the write signal presented to the slider to write the data to a track on the rotating disk surface. The Rapid Off Track write suppression circuit may further include a processor configured to the write suppression signal in response to the Rapid Off Track prediction signal. The processor may assert the write suppression signal to suppress the writing of a sector that has already been started and/or may assert the write suppression signal before the start of writing to the sector. The processor may be implemented by a finite state machine and/or a computer.

DETAILED DESCRIPTION

Figure 1:
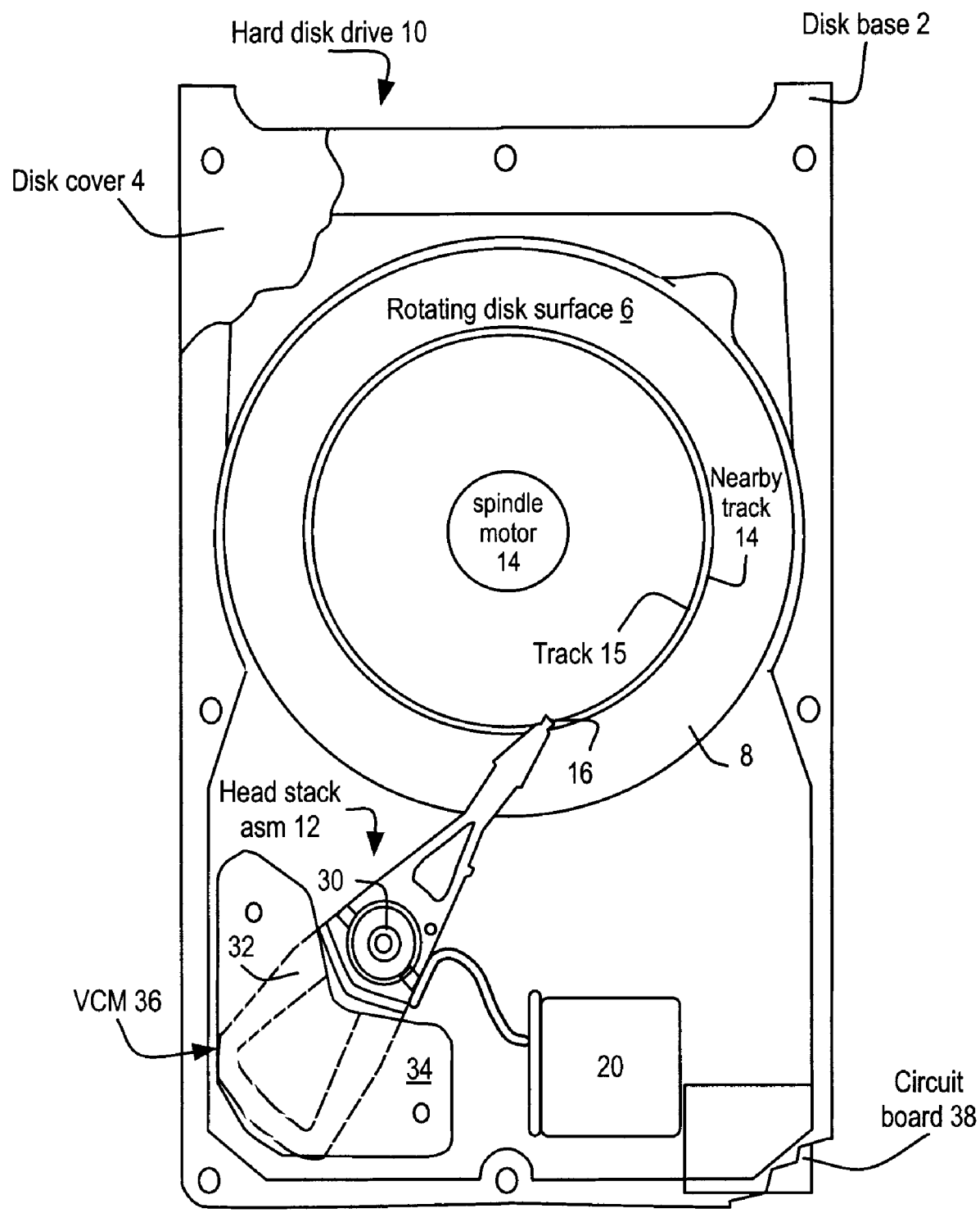
FIG. 1 shows an example embodiment of a hard disk drive that includes a disk base with a spindle motor mounted on it and coupled to at least one disk to create a rotating disk surface. A voice coil motor is mounted on the disk base with its head stack assembly coupling through an actuator pivot to position at least one slider near a track on at least one of the rotating disk surfaces. Communications between the slider and other components of the head stack assembly are sent via an interface to a circuit board mounted on the opposite side of the disk base from the disks and voice coil motor. A disk cover is mounted on the disk base to enclose the disks, spindle motor and voice coil motor.

This invention relates to the detection of Rapid Off Track following and the protecting against nearby track 14 data corruption during Rapid Off Track writing in a hard disk drive 10. Embodiments of the invention may include a hard disk drive comprising a disk base, a spindle motor mounted on the disk base for rotating at least one disk to create at least one rotating disk surface, and a head stack assembly pivotably coupled to the disk base and including voice coil electrically stimulated to position a slider over a track on the rotating disk surface. The voice coil is a movable part of a Voice Coil Motor (VCM) that includes a fixed magnet assembly mounted on the disk base. The hard disk drive uses a self-resonant frequency band 104 of the VCM far above its operational frequency band 100 to predict Rapid Off Track events before the head stack assembly can deliver the disruption to the slider writing a track 15.

Referring to the drawings more particularly by reference numbers, FIG. 1 shows an example embodiment of a hard disk drive 10 that includes a disk base 2 with a spindle motor 14 mounted on it and coupled to at least one disk 8 to create a rotating disk surface 6. A voice coil motor 36 is mounted on the disk base with its head stack assembly 12 coupling through an actuator pivot 30 to position at least one slider 16 near a track 15 on at least one of the rotating disk surfaces. The voice coil motor pivots about the actuator pivot, moving in response to electrical stimulus of the voice coil 32 and its interaction with a fixed magnet assembly 34. Communications between the slider and other components of the head stack assembly are sent via an interface 20 to a circuit board 38 typically mounted on the opposite side of the disk base from the disks and voice coil motor. A disk cover 4 is mounted on the disk base to enclose the disks, spindle motor and voice coil motor.

Figure 2:
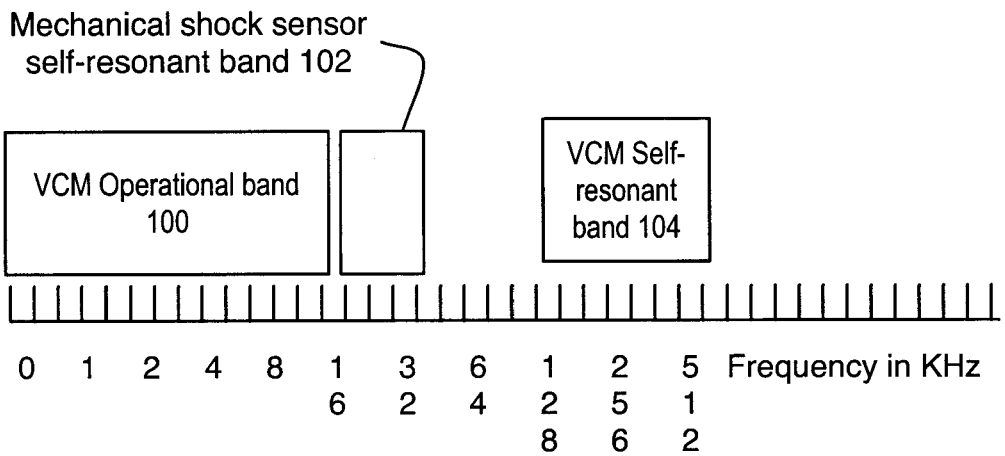
FIG. 2 shows by way example, a simplified logarithmic portrayal of frequency along the horizontal axis with the operational bandwidth for positioning the slider of about 16 K Hz during track following, the self-resonant frequency band of typical prior art mechanical shock sensors between 20 to 30 KHz but the VCM self-resonant bandwidth may be between 150-500 K Hz.

FIG. 2 shows by way example, a simplified logarithmic portrayal of frequency along the horizontal axis with the operational bandwidth 100 for positioning the slider 16 of about 16 K Hz for track following, the self-resonant frequency band 102 of typical prior art mechanical shock sensors between 20 to 30 KHz but the VCM self-resonant bandwidth 104 may be between 150-500 K Hz.

Figure 3:
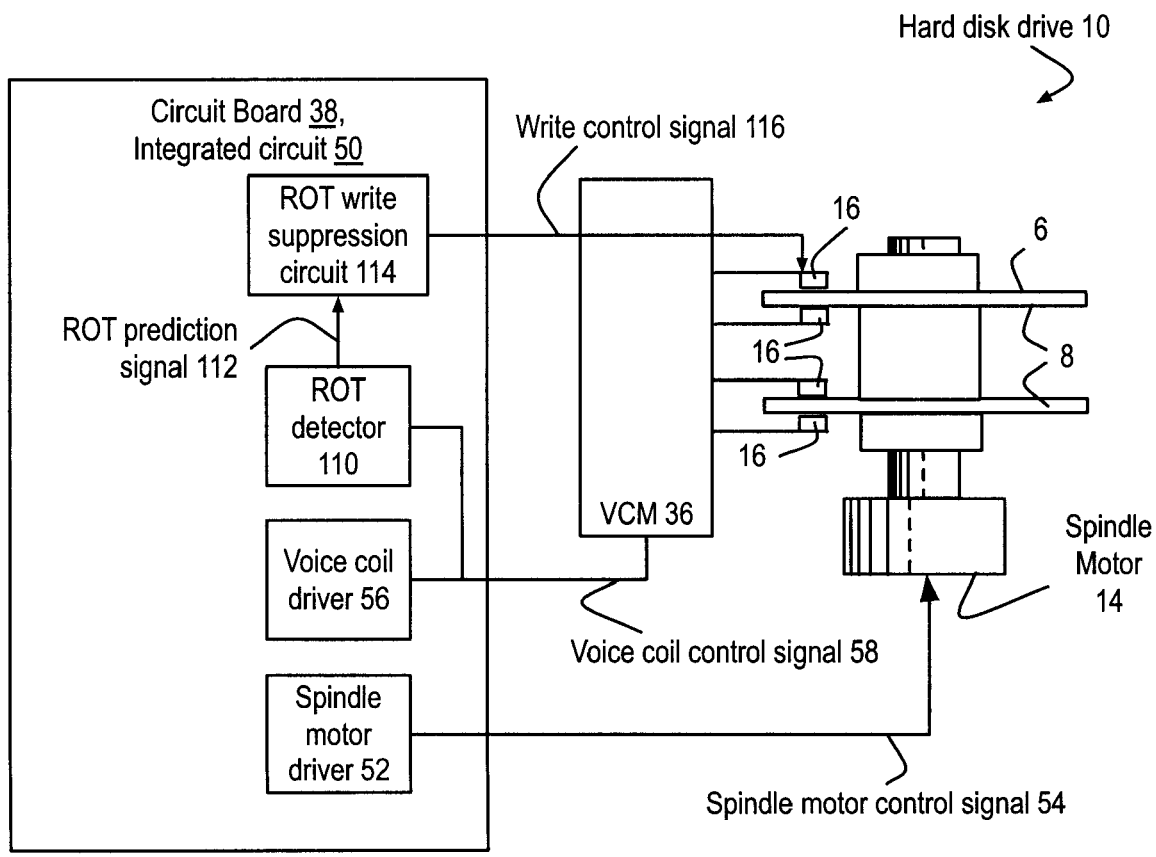
FIG. 3 shows a simplified schematic of the hard disk drive that may further include a Rapid Off Track detector configured to generate a Rapid Off Track prediction signal presented to a Rapid Off Track write suppression circuit that can prevent the write head of the slider from corrupting data of the nearby tracks. The Rapid off Track detector is coupled to a VCM control signal that may be driven to provide the operational frequency band of the VCM. The Rapid Off Track detector amplifies and detects ringing by the VCM in its self-resonant band to create the Rapid Off Track prediction signal before the head stack assembly can mechanically respond to the situation. Rapid Off Track write suppression circuit then stops the ongoing writing of a sector or suppress the soon-to-start writing of a new sector to prevent data corruption of the nearby tracks.

FIG. 3 shows a simplified schematic of the hard disk drive 10 that may further include a Rapid Off Track detector 110 configured to generate a Rapid Off Track prediction signal 112 presented to a Rapid Off Track write suppression circuit 114 that can prevent the write head of the slider 16 from corrupting data of the nearby tracks 14 as shown in FIG. 1. The Rapid off Track detector is coupled to a VCM control signal 58 that may be driven to provide the operational frequency band 100 of the VCM 36. The Rapid Off Track detector amplifies and detects ringing by the VCM in its self-resonant band to create the Rapid Off Track prediction signal before the head stack assembly 12 shown in FIG. 1 can mechanically respond to the situation. Rapid Off Track write suppression circuit then stops the ongoing writing of a sector or suppress the soon-to-start writing of a new sector to prevent data corruption of the nearby tracks.

The hard disk drive may implement some embodiments of the invention as the circuit board 38 and/or as an integrated circuit 50. The circuit board and/or the integrated circuit may include various combinations of the ROT detector 110, the ROT prediction signal 112 and/or the ROT write suppression circuit 114. The circuit board and/or the integrated circuit may further include the voice coil driver 56 configured to generate the voice coil control signal 58 and/or include the spindle motor driver 52 configured to generate a spindle motor control signal 54. Further, the circuit board and/or the integrated circuit may be coupled to the voice coil control signal by a one or more pins that may support the voice coil control signal being implemented by a differential signal pair.

During normal operation of the hard disk drive 10, the spindle motor driver 52 is used to generate the spindle motor control signal 54, which simulates the spindle motor 14 to rotate at least one disk 8 to create the rotating disk surface 6. Once the disk 8 has reached its operational rotating rate, the voice coil driver 56 stimulates the voice coil 32 through the voice coil control signal 58 providing a time-varying electromagnetic signal. The voice coil responds to this stimulus through its interaction with the fixed magnets 34 of the voice coil motor 36 to pivot the head stack assembly 12 through the actuator pivot 30 to position the slider 16 near the track 15.

Figure 4:
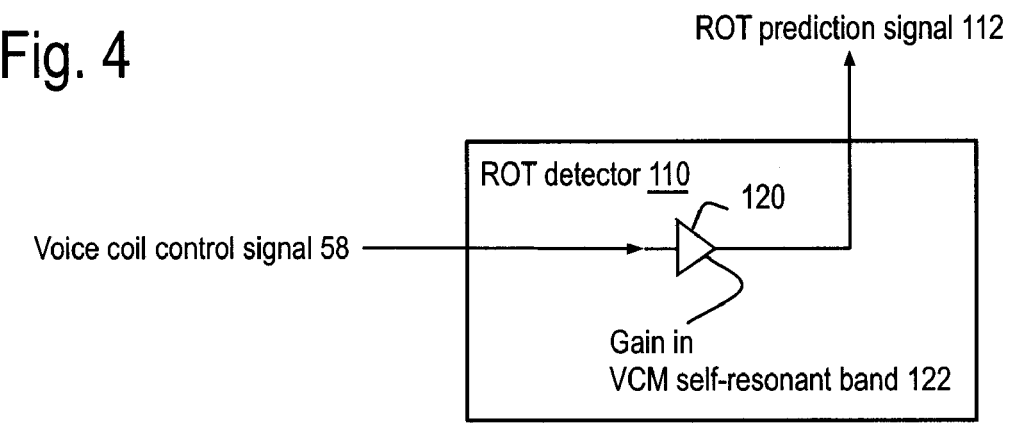
FIGS. 4 to 7 show various examples of the Rapid Off Track detector that may include an amplifier, possibly a comparator, possibly at least one filter, and possibly an Analog to Digital Converter to further create the Rapid Off Track prediction signal.

FIG. 4 shows the Rapid Off Track detector 110 may include an amplifier 120 configured to receive the VCM control signal 58 with a gain in the VCM self-resonant band 122 to at least partly create the VCM self-resonant component 124 of the VCM control signal that may be used to create the ROT prediction signal 112.

Figure 5:
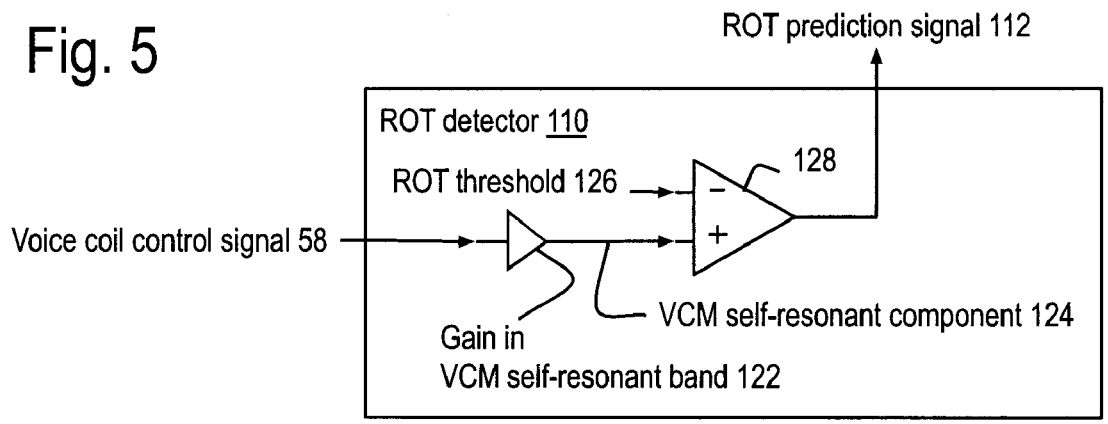

FIG. 5 shows the Rapid Off Track detector 110 may further include a comparator 128 receiving the VCM self-resonant component 124 and a predetermined Rapid Off Track threshold 126 to create the Rapid Off Track prediction signal 112.

Figure 6:
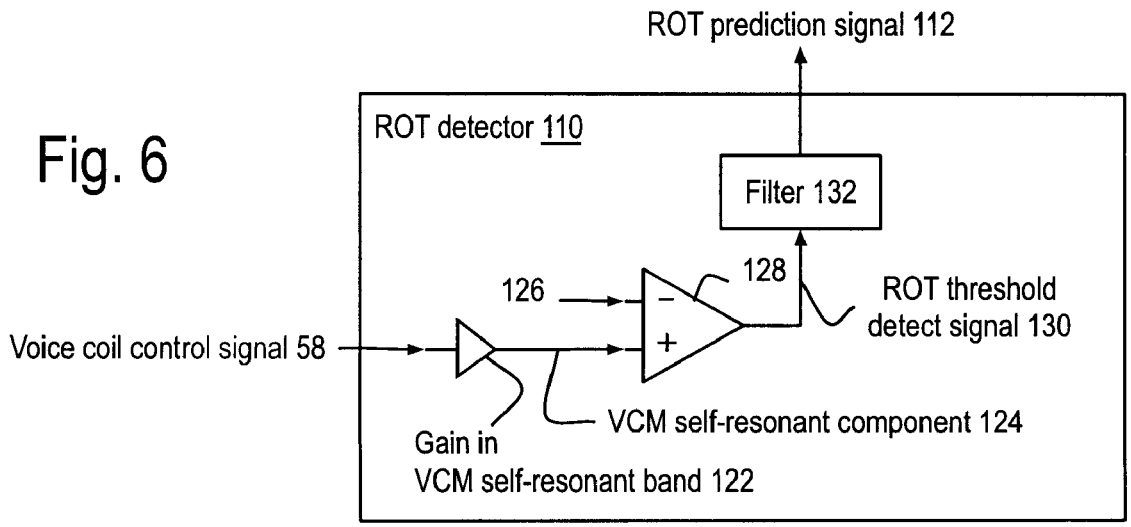

FIG. 6 shows the Rapid Off Track detector 110 may further include at least one filter 132 to further create the Rapid Off Track prediction signal 112 possibly by receiving a ROT threshold detect signal 130 generated by the comparator 128.

Figure 7:
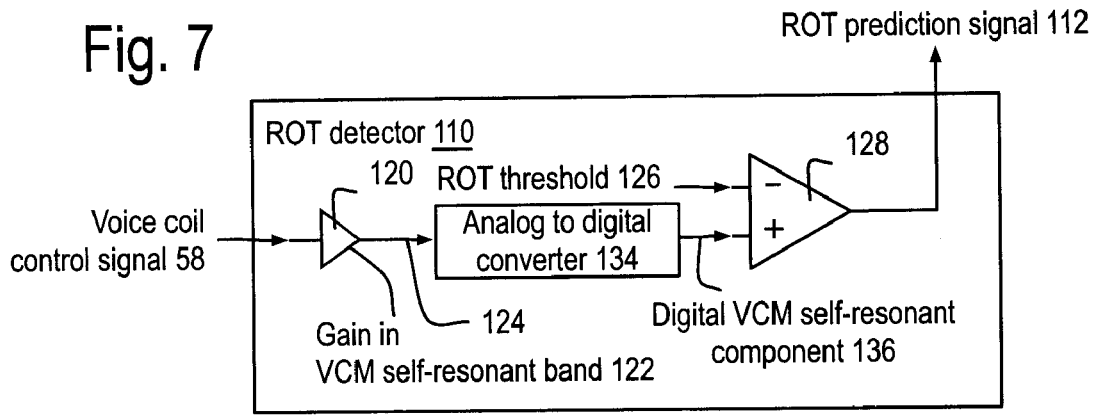

FIG. 7 shows the Rapid Off Track detector 110 may further include at least one instance of an analog to digital converter 134 to further create the Rapid Off Track prediction signal 112, possibly by receiving the VCM self-resonant component 124 from the amplifier 120 configured by a gain in the VCM self-resonant band 122. The analog to digital converter may generate a digital VCM self-resonant component 136 that may be presented to the comparator 128.

In some embodiments, the comparator 128 may be analog as shown in FIGS. 5 and 6 and in other embodiments, it may be digital as shown in FIG. 7. The inputs to the comparator may be analog and the output of the Rapid Off Track prediction signal 112 may be analog and/or digital.

Figure 8:
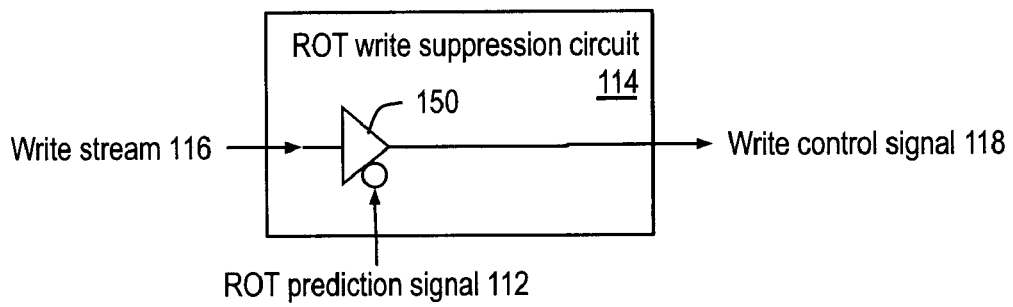
FIGS. 8 and 9 show examples of the Rapid Off Track write suppression circuit that may include an amplifier configured to suppress the write signal and may further include a processor configured to generate the write suppression signal in response to the Rapid Off Track prediction signal.

FIG. 8 shows the Rapid Off Track write suppression circuit 114 may include an amplifier 150 configured with a write suppression signal and receiving a write stream signal 116 to suppress the write control signal 118 presented to the slider 16 to write the data to the track 15 on the rotating disk surface 6. This signal may be triggered in response to the Rapid Off Track prediction signal 112.

Figure 9:
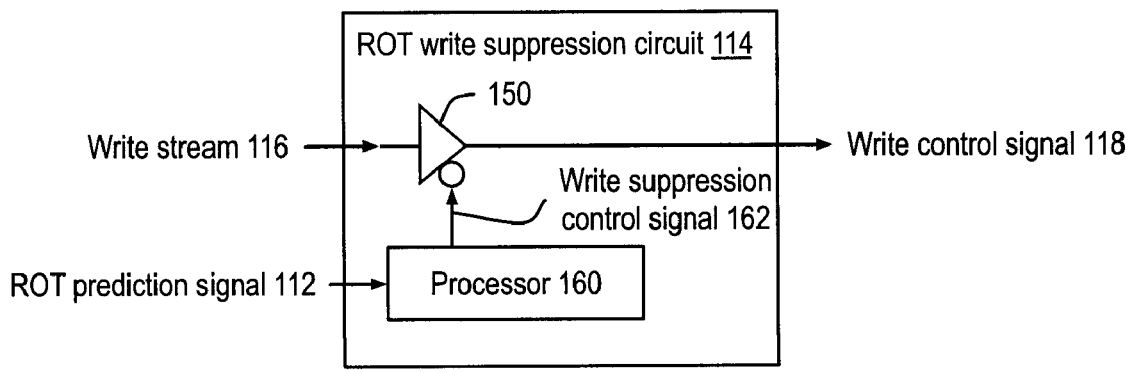

FIG. 9 shows the Rapid Off Track write suppression circuit 114 may further include a processor 160 configured to generate the write suppression signal 162 in response to the Rapid Off Track prediction signal 112. The processor may assert the write suppression signal to suppress the writing of a sector that has already been started and/or may assert the write suppression signal before the start of writing to the sector.

Figure 10:
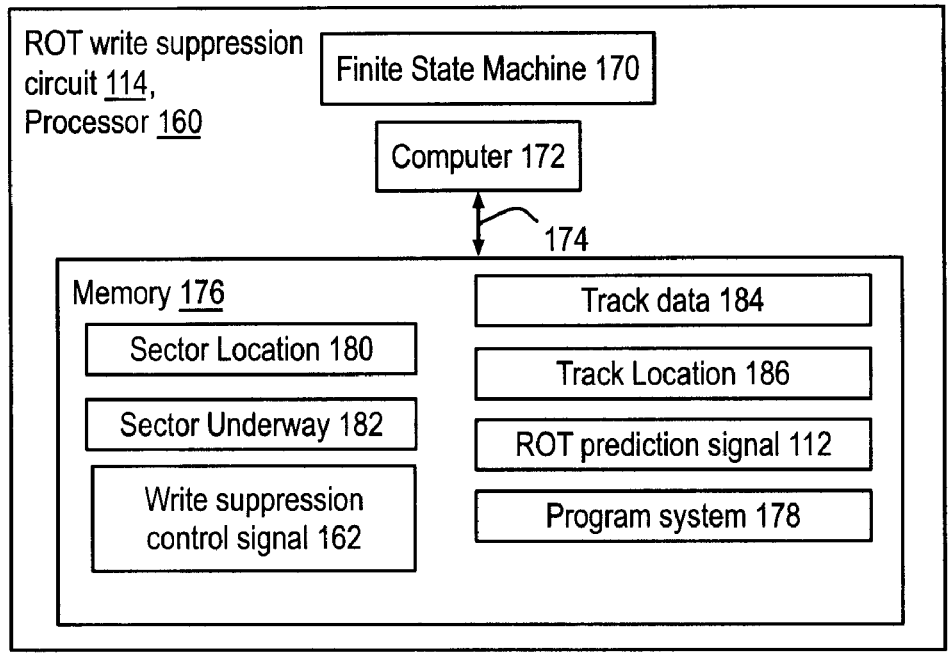
FIG. 10 shows the Rapid Off Track write suppression circuit, in particular, its processor may include at least one instance of a finite state machine and/or at least one instance of a computer accessibly coupled via a buss with a computer readable memory containing a program system for instructing the computer in accord with the various embodiments of the invention's methods.

FIG. 10 shows the Rapid Off Track write suppression circuit 114, in particular, its processor 160 may include at least one instance of a finite state machine 170 and/or at least one instance of a computer 172 accessibly coupled 174 via a buss with a computer readable memory 176 containing a program system 178 for instructing the computer in accord with the various embodiments of the invention's methods. The processor and/or the ROT write suppression circuit may include further information shown here as residing in the memory 176, which may include but is not limited to any combination of the following: a sector location 180, an indication of whether a sector write operation is underway 182, a buffer including at least part of the track data 185, a track location 186, as well as the write suppression control signal 162 and/or the ROT prediction signal 112.

As used herein, a computer 172 may include at least one data processor and at least one instruction processor, with each data processor instructed by at least one instruction processor through the access 174 of program steps of the program system 178 residing in the computer readable memory 176.

As used herein, a finite state machine 170 includes at least one input, maintains at least one state based upon at least one of the inputs and generates at least one output based upon the value of at least one of the inputs and/or based upon the value of at least one of the states.

Some of the following figures show flowcharts of at least one embodiment of the method, which may include arrows signifying a flow of control, and sometimes data, supporting various implementations of the invention's operations. These include a program operation, or program thread, executing upon a computer 172, and/or a state transition in a finite state machine 170. The operation of starting a flowchart refers entering a subroutine or a macro instruction sequence in the computer, and/or directing a state transition in the finite state machine, possibly while pushing a return state. The operation of termination in a flowchart refers completion of those operations, which may result in a subroutine return in the computer, and/or popping of a previously stored state in the finite state machine. The operation of terminating a flowchart is denoted by an oval with the word "Exit" in it.

Figure 11:
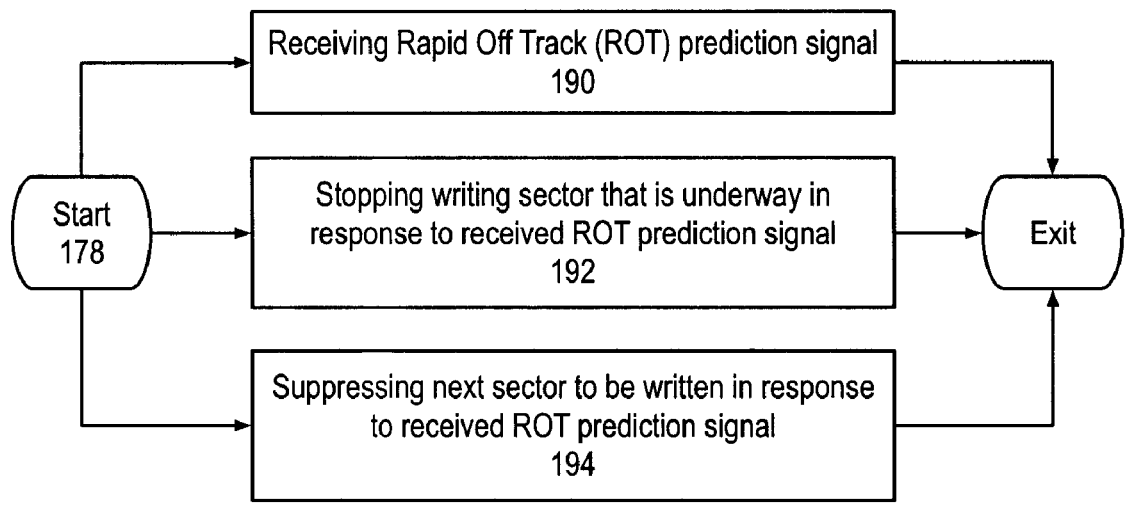
FIG. 11 shows a flow chart of the program system of FIG. 10 receiving the Rapid Off Track prediction signal, stopping the writing of a sector that is underway in response to the received Rapid Off Track prediction signal and suppressing the next sector to be written in response to the received Rapid Off Track prediction signal.

FIG. 11 shows a flow chart of the program system 178 of FIG. 10 implementing examples of some of the inventions method steps shown here as program steps that may individually or collectively be used to operate the hard disk drive 10 in accord with the invention. Various embodiments of the program system may include at least one of these program steps. Program step 190 supports receiving the Rapid Off Track prediction signal 112. Program step 192 supports stopping the writing of a sector that is underway in response to the received Rapid Off Track prediction signal. And program step 194 supports suppressing the next sector to be written in response to the received Rapid Off Track prediction signal.

Manufacturing the hard disk drive 10 may include calibrating the gain in the VCM self-resonant band 122, the ROT threshold 126 and/or the parameters of the filter 132, whether to suppress the writing of a sector that is underway or suppress writing the next sector. The parameters of the filter may include but are not limited to a low pass cutoff frequency, a high pass cutoff frequency, how many frequency bands may have separate gains and the gains of those frequency bands.

The preceding embodiments provide examples of the invention, and are not meant to constrain the scope of the following claims.

What is claimed is:

1. A hard disk drive, comprising:
a disk base;
a spindle motor mounted on said disk base for rotating at least one disk to create at least one rotating disk surface with at least one track;
a Voice Coil Motor (VCM) including a head stack assembly mechanically coupling a slider to a voice coil for responding to a voice coil control signal for positioning said slider over said track subject to disruption by a Rapid Off Track (ROT) event;
an amplifier for amplifying a self-resonant frequency band of said voice coil control signal above an operational frequency band of said VCM used for predicting said ROT events before said head stack assembly delivers said disruption to said slider writing said track; and
wherein:
said amplifier configured for receiving said voice coil control signal for creating a ROT prediction signal for predicting said ROT event includes said amplifier is further configured for amplifying said voice coil control signal in said self-resonant frequency band for creating said ROT prediction signal.

2. The hard disk drive of claim 1, further comprising a comparator for receiving a VCM self-resonant component and a ROT threshold for creating a ROT prediction signal.

3. The hard disk drive of claim 1, further comprising an analog to digital converter for generating a digital representation of a VCM self-resonant component for creating a ROT prediction signal.

4. The hard disk drive of claim 1, further comprising a ROT write suppression circuit configured to respond to a prediction of said ROT event to at least partly suppress a write operation.

5. The hard disk drive of claim 4, wherein said ROT write suppression circuit for responding to a ROT prediction signal.

6. The hard disk drive of claim 5, wherein said ROT write suppression circuit disables the writing of a sector that is underway for responding to said ROT prediction signal.

7. The hard disk drive of claim 5, wherein said ROT write suppression circuit disables writing of a next sector to be written for responding to said ROT prediction signal.

8. A circuit board for use in a hard disk drive, comprising:
a head stack assembly mechanically coupling a slider to a voice coil for positioning said slider over a track on a rotating disk surface subject to disruption by a Rapid Off Track (ROT) event; and
an amplifier for amplifying a voice coil control signal for predicting said ROT event before said head stack assembly delivers said disruption to said slider writing said track includes said amplifier is configured for amplifying said voice coil control signal in a self-resonant frequency band for creating a ROT prediction signal.

9. The circuit board of claim 8, wherein the amplifier configured for receiving said voice coil control signal for creating a ROT prediction signal for predicting said ROT event.

10. The circuit board of claim 8, further comprising a ROT write suppression circuit configured to respond to a prediction of said ROT event to at least partly suppress a write operation.

11. A integrated circuit for use in a hard disk drive, comprising:
a voice coil driver for positioning a head stack assembly mechanically coupling a slider to a voice coil said slider, over a track on a rotating disk surface, subject to disruption by a Rapid Off Track (ROT) event;
an amplifier for amplifying a voice coil control signal used for predicting said ROT event before said head stack assembly delivers said disruption to said slider writing said track; and
wherein:
said amplifier configured for receiving said voice coil control signal for creating a ROT prediction signal for predicting said ROT event includes said amplifier is further configured for amplifying said voice coil control signal in said self-resonant frequency band for creating said ROT prediction signal.

12. The integrated circuit of claim 11, further comprising a comparator for receiving a VCM self-resonant component and a ROT threshold for creating said ROT prediction signal.

13. The integrated circuit of claim 11, further comprising an analog to digital converter for generating a digital representation of a VCM self-resonant component for creating said ROT prediction signal.

14. The integrated circuit of claim 11, further comprising a ROT write suppression circuit configured to respond to a prediction of said ROT event to at least partly suppress a write operation.

15. The integrated circuit of claim 14, wherein said ROT write suppression circuit for responding to said ROT prediction signal.

16. The integrated circuit of claim 15, wherein said ROT write suppression circuit disables the writing of a sector that is underway for responding to said ROT prediction signal.

17. The integrated circuit of claim 15, wherein said ROT write suppression circuit disables writing of a next sector to be written for responding to said ROT prediction signal.

18. A method, comprising the step of:
operating a hard disk drive with a rotating disk surface containing a track subject to disruption by a Rapid Off Track (ROT) event of a slider writing to said track as positioned by a Voice Coil Motor (VCM) for responding to a voice coil control signal, further comprising the steps of:
operating an amplifier for amplifying a self-resonant band of said voice coil control signal above an operational band of said VCM for creating a prediction of said ROT event before a head stack assembly included in said VCM delivers said disruption to said slider writing said track includes said amplifier is configured for amplifying said voice coil control signal in said self-resonant frequency band for creating a ROT prediction signal.

19. The method of claim 18, wherein the step operating said hard disk drive further comprises the step of:
suppressing said slider writing to said track in response to said prediction of said ROT event.

20. The method of claim 19, wherein the step suppressing said slider writing to said track further comprises the step of:
suppressing said slider writing to a sector that is underway.

21. The method of claim 19, wherein the step suppressing said slider writing to said track further comprises the step of:
suppressing said slider writing to a next sector to be written.

* * * * *